United States Patent [19]

Piatt et al.

[11] Patent Number: 4,758,849

[45] Date of Patent: Jul. 19, 1988

[54] HAND-HELD INK JET WITH INSERTABLE CARTRIDGES

[75] Inventors: Michael J. Piatt, Enon; Harry V. March, Beavercreek, both of Ohio

[73] Assignee: Eastman Kodak Company, Rochester, N.Y.

[21] Appl. No.: 1,776

[22] Filed: Jan. 9, 1987

[51] Int. Cl.⁴ .............................................. G01D 15/18

[52] U.S. Cl. .................................. 346/140 R; 346/143; 401/195

[58] Field of Search ................. 346/140, 75, 143, 145; 401/195

[56] References Cited

U.S. PATENT DOCUMENTS

| | | | |
|---|---|---|---|
| 4,102,500 | 7/1978 | Luff | 239/345 |
| 4,168,533 | 9/1979 | Schwartz | 346/75 X |
| 4,412,232 | 10/1983 | Weber | 346/140 |
| 4,500,895 | 2/1985 | Buck et al. | 346/140 R |
| 4,549,243 | 10/1985 | Owen et al. | 361/228 |
| 4,635,080 | 1/1987 | Watanabe | 346/140 |

FOREIGN PATENT DOCUMENTS

| | | |
|---|---|---|
| 58-107399 | 6/1983 | Japan . |
| 1214495 | 2/1986 | U.S.S.R. . |

*Primary Examiner*—Joseph W. Hartary
*Attorney, Agent, or Firm*—John D. Husser

[57] ABSTRACT

A hand held device for spraying liquid utilizes insertable drop-on-demand ink jet cartridges. The disclosed device is simple and inexpensive in design and facilitates interchangeable use of different inks without intervening cleaning.

2 Claims, 4 Drawing Sheets

HAND-HELD INK JET WITH INSERTABLE CARTRIDGES

BACKGROUND OF THE INVENTION

1. Field of the Invention

The present invention relates to apparatus for spraying liquids. In particular, the invention relates to a hand-held spraying apparatus generally similar to an airbrush, employing drop-on-demand ink jet technology.

2. Description of the Prior Art

The term airbrush is commonly used to refer to a hand-held device for spraying liquid with an air stream, e.g. by atomization. These devices find use in various fields such as touch-up painting, drawing shading and other applications where it is useful to apply a fine liquid spray in a controlled manner. Airbrushes currently in use incorporate many complex and expensive mechanical parts that are typically manufactured from brass or stainless steel. An example of a typical prior art airbrush is shown in U.S. Pat. No. 4,102,500.

Air brushes of the type disclosed in the aforementioned patent have several problems in addition to their expense and complexity. The operator is required to have a source of gas flow, such as a compressor or can of compressed nitrogen, that must be connected to the air brush by an awkward hose that limits the operator's freedom of movement. In order to switch from one color of paint to another, the operator is required to perform a messy and time consuming cleaning operation that flushes the air brush with a suitable cleaning fluid. While a paint container may be attached to the air brush when covering large areas with the same color of paint, a small cup located on the top of the air brush is typically utilized when a small amount of paint is required. Use of the small paint cup prevents the operator from having the ability to lay the air brush aside for a moment while he is working.

It may be appreciated from the foregoing, that the utilization of an air brush is a tedious, time consuming and messy process.

SUMMARY OF THE INVENTION

The object of the present invention is to provide a hand-held spray device of simple and inexpensive design that provides functional advantages over the afore-described airbrush. This object is achieved by incorporating the use of drop-on-demand ink jet technology in a hand-held spray device.

A preferred embodiment of the invention provides a hand-held spray device having means for releasable retaining a drop-on-demand ink jet print/cartridge, driver means for activating the print/cartridge to eject ink droplets, and contact means coupled to the driver means for providing electrical contact to the ink jet print/cartridge.

The incorporation of drop-on-demand ink jet technology in a hand-held spray device overcomes the aforementioned limitations of the conventional airbrush. The spray device may contain its own power source eliminating the necessity of a hose connection and colors may be changed easily by changing the insertable print/cartridge.

BRIEF DESCRIPTION OF THE DRAWINGS

With the above as background, reference should now be made to the following figures for a detailed description of the invention.

DETAILED DESCRIPTION OF THE PREFERRED EMBODIMENT

Figure 1:
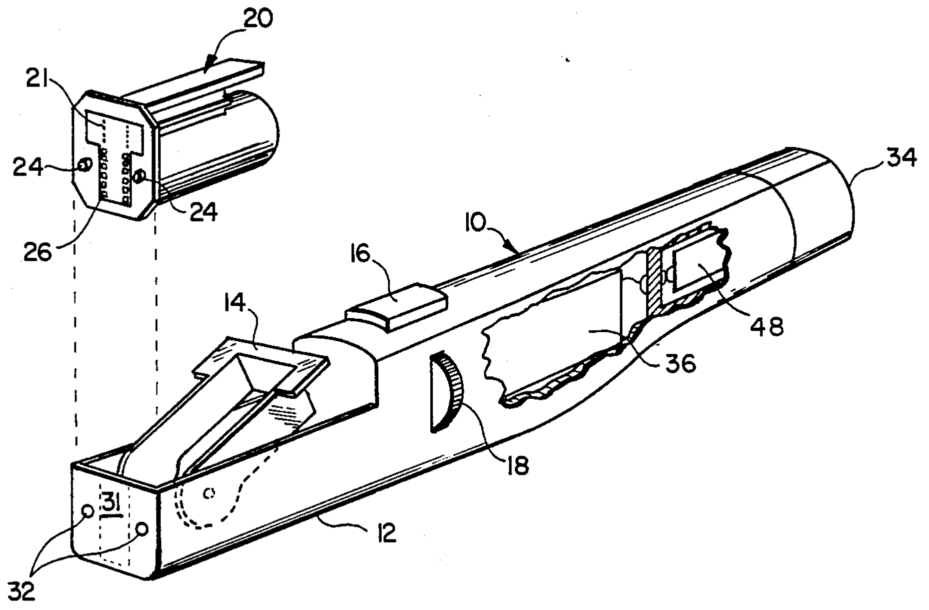
FIG. 1 shows a perspective view of a preferred embodiment of the present invention.

Referring now to FIG. 1, a preferred embodiment of a hand-held ink spray device 10 comprises, in general, a housing 12, a retaining latch 14, a trigger switch 16, and a jet selector switch 18.

Figure 2:
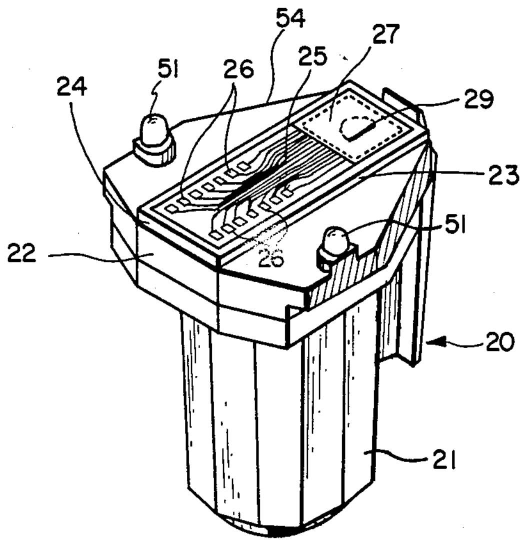
FIG. 2 is a perspective view of one print/cartridge construction useful in accord with the present invention.
Figure 3A:
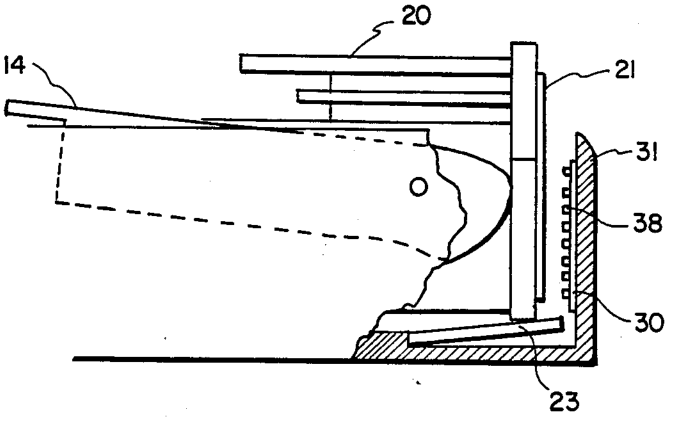
FIGS. 3A and 3B are partial cross-sectional views of the device's print/cartridge retainer well, which illustrates the latched position of the print/cartridge latch mechanism.
Figure 3B:
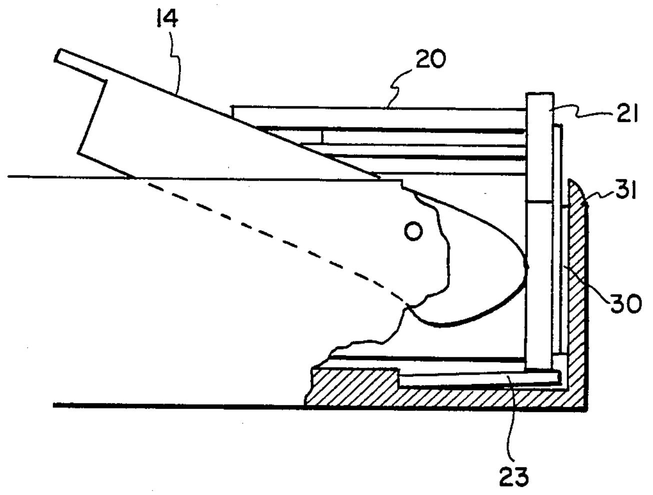

In order to operate the spray device 10, a disposable drop-on-demand ink jet print/cartridge 20, e.g. of a type shown in U.S. Pat. No. 4,500,895, is placed in the housing 12. Such a print/cartridge is shown in more detail in FIG. 2. The print/cartridge 20 is adapted to be disposable when empty of ink and in general comprises an ink supply reservoir 21, cover member 22 which covers the ink reservoir and coarsely positions the print head assembly 23 in housing 12. The print head assembly 23 comprises a driver plate 24 having a plural of electrical leads 25 formed thereon. The leads 25 extend from connector pads 26 to resistive heater elements (not shown) located beneath orifice plate 27. Ink from reservoir 21 is supplied to a location beneath each orifice 29 of plate 27 (and above the heater element for that orifice). Upon application of an electrical print pulse to a terminal pad by the printer control, the corresponding resistive heater element causes an ink vaporization condition which ejects an ink droplet from its corresponding orifice 29 for printing. The orifice plate 27 can be electroformed using photofabrication techniques to provide precisely located orifices and is attached to driver plate 23, which is in turn affixed to the cover member 22. The print/cartridge 20 has a self-contained ink supply and thermal jet resistors that, when energized, cause the ejection of an ink droplet from the jetting orifices 21. Alignment holes 32 are provided in the housing 12, so the print/cartridge 20 may be properly located in the housing 12 by placing the alignment pins 51, of the print/cartridge 20, within the alignment holes 32 of the housing 12. The retaining latch 14 is then raised from the unlatched position shown in FIG. 3A, to the latched position shown in FIG. 3B, to secure the print/cartridge 20 within the housing 12. It should be noted that the housing 12 and retaining latch 14 may be made from a variety of plastic materials using conventional molding techniques.

When the print/cartridge 20 is latched in the housing 12, the contact pads 26 (see FIG. 1) on the print/cartridge 20 are pressed against the electrical contacts 38 of a flexible circuit ribbon 30 that is secured to the front wall 31 of the housing 12. To provide proper contact pressure a small piece of an elastomer material (not shown) may be employed behind the contacts 38. The flexible circuit ribbon 30 extends across the bottom of the housing 12 to jet selector switch means 18 of the spray device 10. The jet selector switch means 18 in turn is electrically connected to the drive control means 36 which supplies electrical signals to drive the thermal jet resistors within the print/cartridge 20. A battery 48 is provided within the housing 12 to provide power to the drive control means 36. A removable end cap 34 is provided on housing 12 to facilitate replacement of the battery 38. If desired, a permanent rechargeable battery may be employed for battery 48. In some applications, it may be desirable to use an external power source instead of battery 48 although this would limit the mobility of the operator to some extent, compared to the FIG. 1 embodiment.

Figure 4:
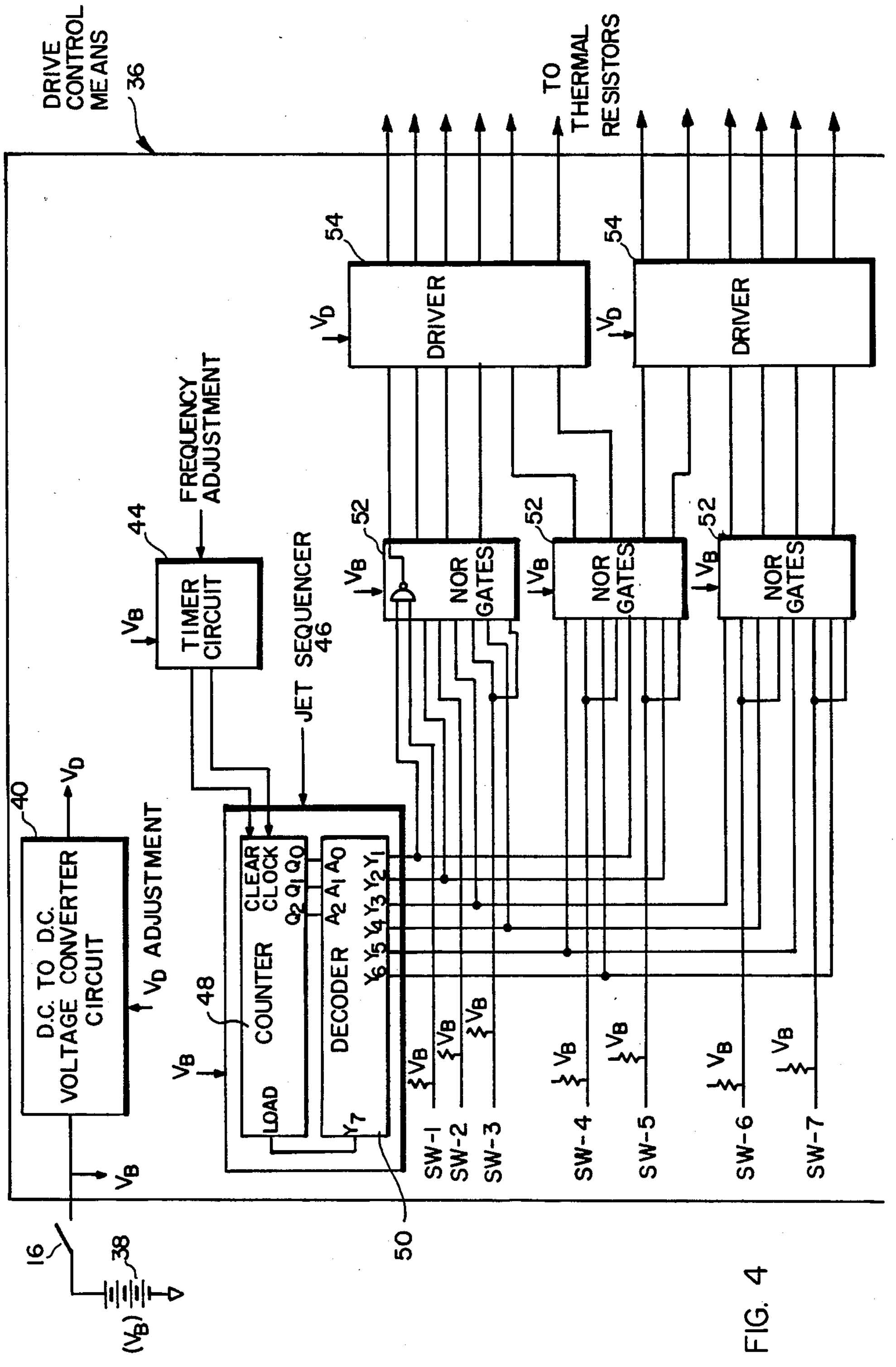
FIG. 4 is a schematic block diagram of a circuit that may be employed for activating the print/cartridge to eject ink droplets.

A circuit that may be employed as the drive control means 36is shown in block diagram form in FIG. 4. A D.C. to D.C. voltage converter circuit 40 is connected to the battery 38 when the trigger switch 16 is closed. The converter circuit 40 converts the low voltage input from the battery ($V_B$) to a voltage level sufficient to drive the thermal jet resistors within the print/cartridge 20. The converter circuit 40 is provided with an adjustment means to vary the drive voltage ($V_D$) if desired.

A timer circuit 44 generates the necessary signals to increment the jet sequencer 46. The jet sequencer 46 is composed of a counter 48 and a decoder 50. The output lines $Q_0$–$Q_2$ of the counter 48 are cleared when the CLEAR input pin of the counter 48 is strobed by the timer circuit 44. The counter 48 is then incremented as the CLOCK pin is strobed by the timer circuit 44. As the counter 48 increments, the output lines $Y_1$–$Y_7$ of the decoder 50 are sequentially strobed. Output lines $Y_1$–$Y_6$ of the decoder 50 are connected to NOR gates 52. The jet selector switch 18 is a rotary switch having seven positions (SW-1 through SW-7) that are grounded in sequence as the switch is rotated. Each switch position is also connector to the NOR gates 52. When a particular switch position is grounded and a corresponding output line of the decoder 50 is strobed (for example when SW-1 is grounded and $Y_1$ strobed), a darlington driver 54 is activated and a corresponding thermal resistor within the print/cartridge 20 is pulsed.

The $Y_7$ output line of the decoder 50 is connected to the LOAD pin of the counter 48. When the LOAD pin is strobed, the counter 48 is loaded with all logic "1's" which in effect freezes the counter 48 until the CLEAR pin is strobed by the timer circuit 44. The drop generation rate may be varied, therefore, by providing the timer circuit 44 with adjustment means for varying the frequency at which the CLEAR pin is strobed. For example, a dual CMOS 555 timer may be employed in the timer circuit 44 with a variable resistor to adjust the frequency. The circuit shown in FIG. 4 allows for the variation of drop generation rate, drive voltage, and the number of jets selected.

The invention has been described with reference to certain preferred embodiments thereof, but it will be understood that variations and modifications within the spirit and scope of the invention are possible. For example, the spray device would work equally well with print/cartridges employing piezoelectric drop-on-demand drop ejection. In addition, various means may be employed for retaining the print/cartridge 20.

What is claimed is:

1. A hand-held ink jet device constructed for use with insertable ink jet print/cartridges to produce ink droplet streams for stroke-marking, said device comprising:

(a) nest means for insertably receiving an ink jet print/cartridge of the type having a self-contained ink supply, a plurality of orifice means and a plurality of discrete jetting means energizable respectively for drop-on-demand ejection of ink droplets through such orifice means;

(b) driver means including a plurality of discrete drivers for respective coupling to said plurality of discrete print/cartridge jetting means, said drivers being selectively actuatable for providing ink jetting electrical energy pulses;

(c) means for electrically coupling said driver means to the jetting means of a print/cartridge inserted in said nest means; and (d) switchable control means for selectively actuating said driver means to provide electrical energy pulses in a continuous series and for selectively controlling different numbers of driver means to energize their respective jetting means with such continuous pulse series.

2. The invention defined in claim 1 wherein said control comprises means for varying the frequency of the continuous pulse series with which said driver means energize said jetting means.

* * * * *